July 11, 1939.   S. L. MADORSKY   2,165,284
PROCESS FOR PRODUCING ELECTROLYTIC MAGNESIUM
Filed Jan. 25, 1938
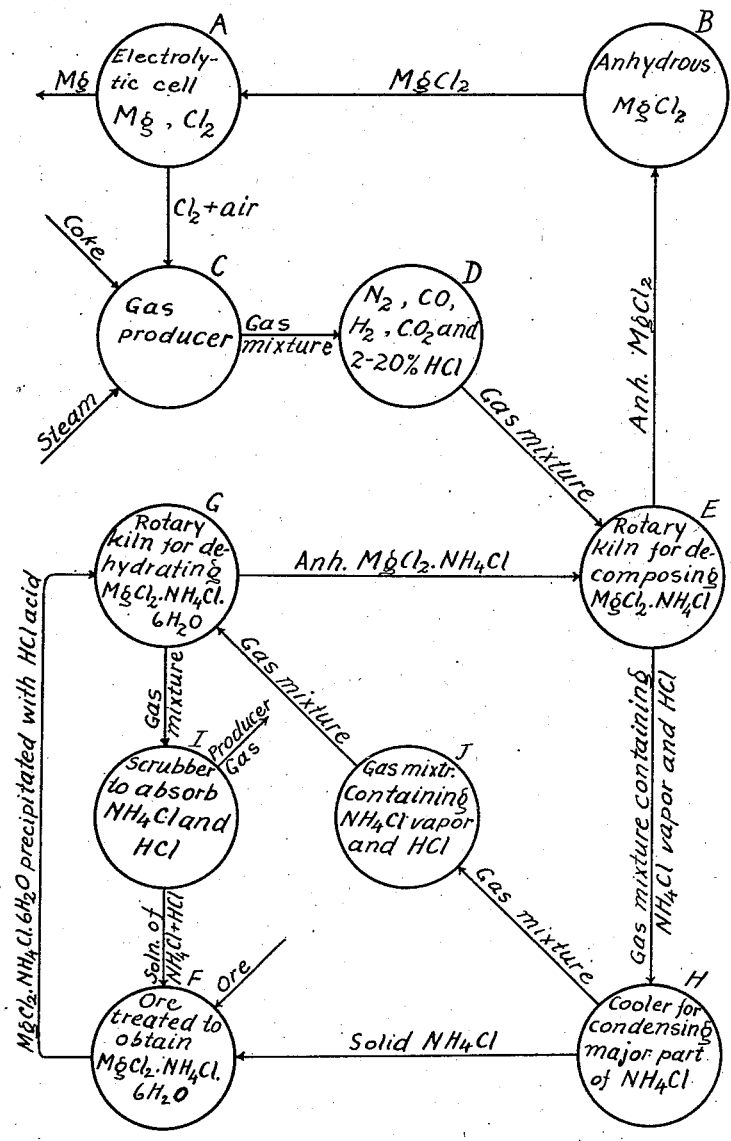
Inventor:
Samuel L. Madorsky Patented July 11, 1939

2,165,284

UNITED STATES PATENT OFFICE 2,165,284

PROCESS FOR PRODUCING ELECTROLYTIC MAGNESIUM

Samuel L. Madorsky, Washington, D. C.

Application January 25, 1938, Serial No. 186,892

10 Claims. (Cl. 204—19)

The present invention relates generally to the extraction of metallic magnesium from magnesium bearing ores, such as dolomite, magnesite, brucite, and containing magnesium carbonate or magnesium oxide or hydroxide or the like. More particularly the present invention relates to such processes in which the ore is treated to convert the magnesium contents thereof into hydrated magnesium ammonium chloride, this in turn being treated by a series of steps which converts the same into anhydrous magnesium chloride, the latter being then subjected to fused electrolysis to obtain metallic magnesium.

It is the main object of the present invention to simplify the process above described and to reduce the cost of the same.

Another object of the present invention is to conduct the process above described in such a manner that the chlorine generated in the electrolytic cell is converted into a hydrogen chloride containing gas mixture which is employed directly in the process in its gaseous form.

A further object of this invention is to utilize the chlorine, liberated in the electrolysis, in an efficient and economical manner.

Another object of this invention is to provide a highly efficient cyclic process for the preparation of magnesium from magnesium ammonium chloride in which the metallic product of electrolysis is recovered, and the gaseous products are utilized to prepare the salt used in the electrolytic operation.

Still another object of this invention is to provide a novel method of preparing a gaseous mixture highly suitable for preparing my starting material for electrolysis.

A further object of this invention is to provide a novel method of decomposing magnesium ammonium chloride to form $NH_4Cl$ and anhydrous $MgCl_2$.

The ordinary magnesium bearing ores, such as dolomite, magnesite and brucite, contain various amounts of calcium, iron and aluminum which must be separated from the $MgCl_2$ before the latter can be used for electrolysis, and I find that by dissolving the ore with hydrochloric acid and adding to the solution a sufficient amount of $NH_4Cl$ to convert the $MgCl_2$ in the solution to $MgCl_2.NH_4Cl$ in solution, I can precipitate the iron and aluminum as $Fe(OH)_3$ and $Al(OH)_3$ by neutralizing the solution with ammonia or ammonium hydroxide, and then precipitate the calcium as $CaSO_4$ by adding to the solution sulphuric acid or magnesium sulphate, without precipitating magnesium ammonium chloride, thus affording an easy and economical means of eliminating injurious impurities.

A previous method of preparing anhydrous $MgCl_2$ from magnesium ammonium chloride consists in preparing hydrated magnesium ammonium chloride, $MgCl_2.NH_4Cl.6H_2O$, then heating the $MgCl_2.NH_4Cl.6H_2O$ to a temperature high enough to drive off the water of hydration, but materially below the dissociation temperature of $MgCl_2.NH_4Cl$, that is to about 215–230° centigrade, and then dissociating the $MgCl_2.NH_4Cl$ by introducing it in a bath of molten anhydrous $MgCl_2$. I find, however, that on heating $MgCl_2.NH_4Cl.6H_2O$ even to 175° centigrade, the $NH_4Cl$ begins to vaporize, before all of the water of hydration is removed, thus exposing the $MgCl_2$ to the reaction with $H_2O$ to form $MgO$ and $HCl$, in accordance with the equation:

(1) 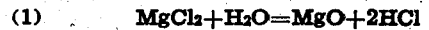 $MgCl_2 + H_2O = MgO + 2HCl$

Besides, the method of vaporizing the $NH_4Cl$ from the $MgCl_2.NH_4Cl$ by introducing the latter in a bath of molten $MgCl_2$ is difficult and uneconomical. In view of the fact that $MgCl_2$ has a melting point of 708° centigrade and that the evaporation of $NH_4Cl$ and its complete dissociation into $NH_3$ and $HCl$ at such a high temperature require a great deal of energy, the bath would have to be maintained at a temperature far above 708° centigrade.

Another previous method of preparing anhydrous $MgCl_2$ from magnesium ammonium chloride consists in first forming the double salt, $MgCl_2.NH_4Cl.6H_2O$, then heating this double salt in a stream of air at a lower temperature until $MgCl_2.NH_4Cl.2H_2O$ is obtained, and finally heating the $MgCl_2.NH_4Cl.2H_2O$ at a higher temperature, in a stream of pure dry gaseous $HCl$, to free the $MgCl_2$ from the $NH_4Cl$ and the $H_2O$ simultaneously.

This application is a continuation in part of my earlier application Serial No. 123,312, filed January 30, 1937, in which I have described a similar method of preparing metallic magnesium from ordinary magnesium bearing ores.

The reason why pure dry gaseous $HCl$ has to be used in removing the $NH_4Cl$ and $H_2O$ simultaneously lies in the fact that the $MgCl_2$ and $H_2O$ in the $MgCl_2.NH_4Cl.2H_2O$ are intimately associated. When the $MgCl_2.NH_4Cl.2H_2O$ is heated at a high temperature the $MgCl_2$ part reacts with the $H_2O$ part in the same compound to form $MgO$ and $HCl$, as follows:

(2) $MgCl_2.NH_4Cl.2H_2O =$
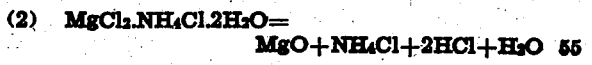
$MgO + NH_4Cl + 2HCl + H_2O$

By carrying out this heating step in a stream of pure dry gaseous HCl this reaction is prevented from taking place.

The preparation of dry gaseous HCl, substantially free from other gases and water vapor, is an expensive and difficult procedure. I find that if I use substantially anhydrous MgCl₂.NH₄Cl in the final step of preparing anhydrous MgCl₂, I can free the MgCl₂.NH₄Cl from NH₄Cl by heating it in an atmosphere containing from about 2 to 20% by volume of gaseous HCl at temperatures between about 300–500° centigrade. The advantage of using an atmosphere having a low content of HCl lies in the following facts.

The easiest and cheapest way of converting the chlorine, resulting from the electrolysis of MgCl₂, into HCl, is to react this chlorine with steam and coke at an elevated temperature. The resulting gas will contain carbon monoxide and HCl in accordance with the equation:

(3) $\quad Cl_2 + H_2O + C = 2HCl + CO$

Since it is difficult to feed into the converter the exact amount of steam required in the reaction with Cl₂, the amount used should be in excess of the equivalent amount reacting with the Cl₂ in order to insure complete conversion of the latter into HCl. The excess H₂O, not reacting with Cl₂, will react with the coke to give CO and H₂, thus diluting the HCl in the gaseous mixture.

Aside from this, in the ordinary practice of electrolyzing fused MgCl₂, the chlorine coming off at the anode is mixed with a large volume of air in order to protect the apparatus, in which the hot chlorine is handled, from corrosion. This air admixed with the chlorine, on reacting with the coke in the gas producer, forms CO and CO₂, thus diluting the HCl containing gas still further with these gases and with nitrogen.

One of the objects of this invention is to provide an efficient and economical method for producing the gaseous stream required in the step of removing NH₄Cl from anhydrous MgCl.NH₄Cl.

In previous attempts to convert the Cl₂ into HCl by reacting the Cl₂ with steam and a solid carbonaceous fuel, the reaction was carried out under such conditions that the gaseous mixture contained, in addition to HCl, CO, CO₂ and N₂, a substantial amount of water vapor. Moreover, in the processes hitherto known, the gases generated by the gas producer were cooled and scrubbed for the absorption of the hydrogen chloride gas, and the hydrochloric acid thus obtained was subsequently treated in a series of steps so as to yield a stream of pure dry hydrogen chloride gas.

In my process, a gas containing a small amount of gaseous HCl, say from 2 to 20%, but substantially free from H₂O vapor, can be used in the step of preparing anhydrous MgCl₂ from anhydrous MgCl₂.NH₄Cl, the variation in the proportion of HCl in the gas depending upon temperature of operation of this step and degree of freedom of the gas from water vapor.

To obtain such a gaseous mixture, dry solid carbonaceous fuel, such as dry coke, is fed into a converter of the type used in making producer gas. A mixture of Cl₂, air and steam is passed thru the incandescent coke bed. The amount of steam used is in excess of the equivalent amount required to convert all of the Cl₂ into HCl. The excess steam reacts with the coke to give CO and H₂, in accordance with the equation:

(4) $\quad C + H_2O = CO + H_2$

To insure complete conversion of Cl₂ and H₂O into HCl, CO and H₂, the fuel bed is kept hot and deep. The exact temperature and depth of the fuel bed will depend on the size of the converter and the amount of air and steam introduced with the chlorine. Under these conditions, the gas mixture will be free from water vapor and chlorine and will consist of N₂, CO, H₂, HCl and some CO₂.

The hot gases issuing from the converter contain some dust. This dust is allowed to settle in settling boxes or is removed by means of dust catchers, and then, while the gas is still hot, it is passed through the rotary kiln or similar apparatus, containing the anhydrous magnesium ammonium chloride, for the purpose of vaporizing and carrying off the ammonium chloride and obtaining anhydrous MgCl₂.

Thus, all the expensive and difficult steps of first absorbing the HCl in water to separate it from the other gases, then removing it from the water, drying and heating it to the proper temperature, are avoided.

Another object of this invention is to provide a novel and efficient method of preparing anhydrous magnesium ammonium chloride, MgCl₂.NH₄Cl to be used in the final steps of preparing anhydrous MgCl₂. As was pointed out above, when MgCl₂.NH₄Cl.6H₂O is heated, the NH₄Cl begins to vaporize before all of the water has vaporized, so that the MgCl₂ is exposed and is free to react with the H₂O.

To avoid this difficulty, I use as the atmosphere for vaporizing and removing the H₂O from the MgCl₂.NH₄Cl.6H₂O, an atmosphere saturated with NH₄Cl vapor, at a temperature of about 160–220° centigrade. Under such conditions, where the atmosphere is saturated with NH₄Cl, the NH₄Cl in the magnesium ammonium chloride is prevented from vaporizing while the H₂O is being vaporized, and the resulting product will be anhydrous MgCl₂.NH₄Cl.

To obtain an atmosphere saturated with ammonium chloride vapor, the gaseous mixture, after it passes from the rotary kiln where the NH₄Cl is vaporized from anhydrous MgCl₂.NH₄Cl, at about 300–500°, is cooled to about 220° centigrade to condense the bulk of the NH₄Cl as a solid salt. The gas mixture, still containing gaseous NH₄Cl, is then used as the NH₄Cl saturated atmosphere in the step of vaporizing 6H₂O from MgCl₂.NH₄Cl.6H₂O, to obtain anhydrous MgCl₂.NH₄Cl.

Still another object of this invention is to recirculate the NH₄Cl, liberated from the MgCl₂.NH₄Cl and the HCl, prepared from the Cl₂, in the preparation of new batches of magnesium ammonium chloride from an acid soluble basic magnesium compound, such as MgCO₃, MgO, Mg(OH)₂ and the like.

The gaseous mixture after passing thru the rotary kiln or similar container, where the 6H₂O is vaporized from the MgCl₂.NH₄Cl.6H₂O, is washed or scrubbed with water to remove from it NH₄Cl and HCl.

The HCl solution containing some NH₄Cl is then reacted with the acid soluble basic Mg compound to form MgCl₂ in solution. The condensed solid NH₄Cl is then added to this solution to form MgCl₂.NH₄Cl in solution. The magnesium ammonium chloride is then separated from the solution in the form of $MgCl_2.NH_4Cl.6H_2O$ by introducing into the solution a further amount of concentrated hydrochloric acid and the $$MgCl_2.NH_4Cl.6H_2O$$

is used in the preparation of anhydrous $$MgCl_2.NH_4Cl$$

and then anhydrous $MgCl_2$.

The following is a detailed description of my process. Anhydrous magnesium chloride is electrolyzed from a fused bath in an electrolytic cell to obtain metallic Mg and $Cl_2$. The hot $Cl_2$ is mixed, as it comes off the anode, with air, and the mixture is passed together with steam thru an incandescent carbonaceous fuel bed in a gas producer into which is fed dry coke. The resulting gas mixture containing $N_2$, CO, $H_2$, $CO_2$ and HCl is then passed thru a dust settler or dust catcher and then, while still hot, at about 300–500° centigrade, thru a rotary kiln containing an hydrous $MgCl_2.NH_4Cl$. The $NH_4Cl$ vaporizes and is carried off by the gaseous stream, and the anhydrous $MgCl_2$ is transferred to the electrolytic cell.

The gas mixture containing the $NH_4Cl$ vapor is cooled in a condenser to about 220° centigrade to condense the $NH_4Cl$ in the form of a solid salt. The gas mixture issuing from the condenser, while still saturated with $NH_4Cl$ vapor at about 160°–220° centigrade, is passed thru a second rotary kiln containing $MgCl_2.NH_4Cl.6H_2O$. The $6H_2O$ vaporizes as steam and the anhydrous $MgCl_2.NH_4Cl$ is passed to the first rotary kiln to be heated at the higher temperature to obtain anhydrous $MgCl_2.NH_4Cl$.

The gas mixture which in the meantime has cooled to about 160° centigrade and still containing gaseous HCl and some uncondensed $NH_4Cl$, is washed or scrubbed with water to remove the HCl and $NH_4Cl$ in the form of an aqueous solution. The gas mixture, now free from $NH_4Cl$ and HCl, and containing $N_2$, CO, $H_2$ and $CO_2$, is of the nature of producer gas and is used for various purposes, such as raising steam to be used in the gas producer or to heat the electrolytic cell.

The HCl solution is transferred to the reaction tank containing an acid soluble basic Mg compound, such as $MgCO_3$, MgO, $Mg(OH)_2$ and the like, where the reactions:

(5) $MgCO_3+2HCl=MgCl_2+H_2O+CO_2$ or (6) $MgO+2HCl=MgCl_2+H_2O$ or (7) $Mg(OH)_2+2HCl=MgCl_2+2H_2O$ preferably at 50–100° centigrade, take place. The condensed $NH_4Cl$ salt is then transferred to the reaction tank where it reacts with the $MgCl_2$ in solution to form $MgCl_2.NH_4Cl$ in solution.

Any silica present in the acid soluble magnesium bearing material remains undissolved. Any Fe, Al or similar metals present in the Mg bearing material as impurities, react with the HCl to form chlorides. These chlorides are precipitated as hydroxides by neutralizing the solution in the reaction tank with $NH_3$ or $NH_4OH$. Any Ca present in the Mg bearing material as an impurity is precipitated in the same reaction tank as $CaSO_4$, by means of $H_2SO_4$, or $MgSO_4$ or $(NH_4)_2SO_4$.

The solution in the reaction tank is filtered, while still hot, from the precipitated impurities, $Fe(OH)_3$, $Al(OH)_3$, $CaSO_4$ and from the silica. To the hot filtrate is then added some concentrated hydrochloric acid and the filtrate allowed to cool. The crystals of $MgCl_2.NH_4Cl.6H_2O$ settle to the bottom and are separated from the mother liquor by decantation. The $MgCl_2.NH_4Cl.6H_2O$ crystals are then treated to obtain anhydrous $MgCl_2.NH_4Cl$, etc. as described above.

The mother liquor from the $MgCl_2.NH_4Cl.6H_2O$ is really concentrated HCl acid and is used for salting out $MgCl_2.NH_4Cl.6H_2O$ from the next batch of hydrochloric acid treated ore, in the step where concentrated HCl acid is added to the hot filtrate from the precipitated $CaSO_4$, $Fe(OH)_3$, $Al(OH)_3$ and from the silica.

Summarizing now the various steps of the process and referring to the drawing, anhydrous $MgCl_2$ is electrolyzed from a fused bath in the cell A, the Mg is tapped in molten state at regular intervals, while the $Cl_2$ is mixed with air and the mixture passed together with steam into the gas producer C, into which is also fed dry coke.

The gas mixture D is passed into the rotary kiln E where $MgCl_2.NH_4Cl$ is decomposed into $MgCl_2$ and $NH_4Cl$. The $MgCl_2$ B is passed into the electrolytic cell A, while the gas mixture, containing the $NH_4Cl$ in the form of a vapor, is passed to a cooler H where the bulk of the $NH_4Cl$ condenses as a dry solid salt. The gas mixture J, saturated with $NH_4Cl$ vapor, is then passed into a second rotary kiln G where $MgCl_2.NH_4Cl.6H_2O$ is dehydrated. The anhydrous $MgCl_2.NH_4Cl$ is passed to the rotary kiln E, while the gas mixture is passed to the scrubber I to remove from it HCl and $NH_4Cl$. The producer gas, freed from HCl and $NH_4Cl$, is then removed to a gas holder, while the aqueous solution of HCl and $NH_4Cl$ is transferred to F where it reacts with a Mg bearing ore. The solid $NH_4Cl$ is then transferred from H to F, where it reacts with $MgCl_2$ in solution to form $MgCl_2.NH_4Cl$ in solution. Concentrated HCl acid is then introduced into F to salt out $MgCl_2.NH_4Cl.6H_2O$. The mother liquor is decanted and the $$MgCl_2.NH_4Cl.6H_2O$$

is transferred to the rotary kiln G.

By the process of this invention as described, it is possible to utilize the reagents necessary for the operation of this process to their fullest extent, while the operation of the complete cyclic process as described permits of the greatest efficiency. It is within the purview of this invention to utilize any single step by itself or to combine any or all of these operations in any desired sequence.

I claim:

1. The process of preparing metallic magnesium from substantially anhydrous magnesium ammonium chloride which comprises decomposing said magnesium ammonium chloride by contacting it at elevated temperatures with a gaseous mixture produced by passing electrolytic chlorine together with steam and air through a bed of incandescent carbonaceous material to produce a mixture containing hydrogen chloride and gaseous products of combustion and reaction substantially free from water vapor, forming substantially anhydrous magnesium chloride and ammonium chloride vapor thereby, and electrolyzing the substantially anhydrous magnesium chloride in a fused bath to produce metallic magnesium and chlorine.

2. The process of claim 1 in which the ammonium chloride vapor, together with the hydrogen chloride from the step of decomposing magnesium ammonium chloride is contacted in aqueous solution with acid soluble magnesium bearing ore to form magnesium ammonium chloride.

3. The method of extracting magnesium from magnesium bearing ores comprising the steps of contacting said ores with hydrochloric acid and ammonium chloride to form magnesium ammonuim chloride in aqueous solution, separating the said magnesium ammonium chloride as a hydrate, dehydrating said hydrated magnesium ammonium chloride to form substantially anhydrous magnesium ammonium chloride, heating said anhydrous magnesium ammonium chloride in an atmosphere substantially free from water vapor comprising a gaseous mixture containing hydrogen chloride gas and other gaseous products of reaction produced by the thermal reduction of electrolytic chlorine to decompose said substantially anhydrous magnesium ammonium chloride into substantially anhydrous magnesium chloride and ammonium chloride, and electrolyzing the magnesium chloride in a fused bath to produce metallic magnesium and chlorine.

4. The method according to claim 3, in which the hydrated magnesium ammonium chloride is dehydrated by heating in an atmosphere saturated with ammonium chloride obtained during the decomposition of magnesium ammonium chloride.

5. The method according to claim 3 in which the gaseous mixture containing ammonium chloride and hydrogen chloride from the step of decomposing magnesium ammonium chloride is contacted in aqueous solution with magnesium bearing ore to form magnesium ammonium chloride.

6. The cyclic process for the production of magnesium which comprises subjecting substantially anhydrous magnesium chloride to electrolysis in a molten bath to produce metallic magnesium and chlorine, passing the chlorine together with steam and air through a bed of incandescent carbonaceous material to form a mixture of gaseous hydrogen chloride and other gaseous products of combustion and reaction, but substantially free from water vapor, contacting the gaseous mixture with anhydrous magnesium ammonium chloride at elevated temperatures to convert the latter into substantially anhydrous magnesium chloride by removing the ammonium chloride in the form of a vapor, and electrolyzing the substantially anhydrous magnesium chloride in a molten bath to produce metallic magnesium and a further supply of chlorine.

7. The cyclic process for the production of magnesium which comprises subjecting substantially anhydrous magnesium chloride to electrolysis in a molten bath, passing the chlorine liberated in the electrolysis together with air and steam, through a bed of incandescent carbonaceous material to obtain a mixture of gaseous hydrogen chloride and other gaseous products of combustion and reaction, controlling the depth of the fuel bed and the proportions of chlorine, air and steam, and the amount of moisture in the fuel, to insure substantially complete interaction of chlorine, steam, air and carbon to form a gaseous mixture comprising hydrogen chloride, hydrogen, carbon monoxide, nitrogen and some carbon dioxide, contacting the gaseous mixture with substantially anhydrous magnesium ammonium chloride at elevated temperatures to convert the latter into substantially anhydrous magnesium chloride by removing the ammonium chloride in the form of a vapor, and electrolyzing the substantially anhydrous magnesium chloride in a molten bath to produce metallic magnesium and chloride.

8. The cyclic process for the production of magnesium which comprises subjecting substantially anhydrous magnesium chloride to electrolysis in a molten bath, passing the chlorine liberated in the electrolysis together with steam and air, through a bed of incandescent carbonaceous material to form a mixture of hydrogen chloride and other gaseous products of combustion and reaction, but substantially free from water vapor, bringing the gaseous mixture into contact with substantially anhydrous magnesium ammonium chloride at elevated temperatures to convert the latter into substantially anhydrous magnesium chloride while removing the ammonium chloride in the form of a vapor, cooling the gaseous mixture to a temperature sufficient to condense a major portion of the ammonium chloride in the form of a solid salt, bringing the gaseous mixture, while still hot and saturated with ammonium chloride vapors at the lower temperature into contact with hydrated magnesium ammonium chloride to convert the latter into substantially anhydrous magnesium ammonium chloride by removing the water associated with it in the form of water vapor, contacting an aqueous solution of the hydrogen chloride and ammonium chloride in the gaseous mixture remaining from the dehydration step with an acid soluble oxygen containing compound of magnesium together with the ammonium chloride condensed after the decomposition of the magnesium ammonium chloride to form hydrated magnesium ammonium chloride, dehydrating the hydrated salt to obtain substantially anhydrous magnesium ammonium chloride for the conversion to substantially anhydrous magnesium chloride for the electrolytic step.

9. The cyclic process for the production of magnesium which comprises subjecting substantially anhydrous magnesium chloride to electrolysis in a molten bath, feeding the chlorine produced thereby together with steam and air into a suitable gas producer operated on solid carbonaceous fuel to obtain a mixture of products of combustion and reaction and gaseous hydrogen chloride, but substantially free from water vapor, contacting the gaseous mixture, while it is still hot, with substantially anhydrous magnesium ammonium chloride at a temperature of about 300°–500° centigrade to vaporize and carry off ammonium chloride, separating the major part of the ammonium chloride from the gaseous mixture through condensation by cooling to about 160°–220° centigrade, contacting the gaseous mixture saturated with ammonium chloride vapor at this temperature with hydrated magnesium ammonium chloride to remove the water of hydration, separating the ammonium chloride and hydrogen chloride from the gaseous mixture in the form of an aqueous solution, reacting the solution and the condensed ammonium chloride with an acid soluble magnesium bearing ore to obtain hydrated magnesium ammonium chloride, dehydrating said hydrated compound to form substantially anhydrous magnesium ammonium chloride, and decomposing said anhydrous compound to form ammonium chloride and anhydrous magnesium chloride.

10. The process for extracting metallic magnesium from magnesium bearing ores which comprises contacting said ores with hydrochloric acid solution, adding ammonium chloride to the resulting ore solution to form magnesium ammonium chloride, separating said magnesium ammonium chloride in the form of its hydrated compound, dehydrating said hydrated compound to form substantially anhydrous magnesium ammonium chloride, contacting said magnesium ammonium chloride in solid state at elevated temperatures with a substantially moisture-free gaseous atmosphere containing hydrogen chloride to decompose it into substantially anhydrous magnesium chloride and ammonium chloride vapor, contacting said ammonium chloride with the magnesium bearing ore in hydrochloric acid solution to form a further supply of magnesium ammonium chloride, and electrolyzing the magnesium chloride in a fused bath to form metallic magnesium.

SAMUEL L. MADORSKY.